Jan. 2, 1934.   G. F. PUTNAM   1,941,756
ROLLER ABSTRACTOR
Filed July 30, 1932
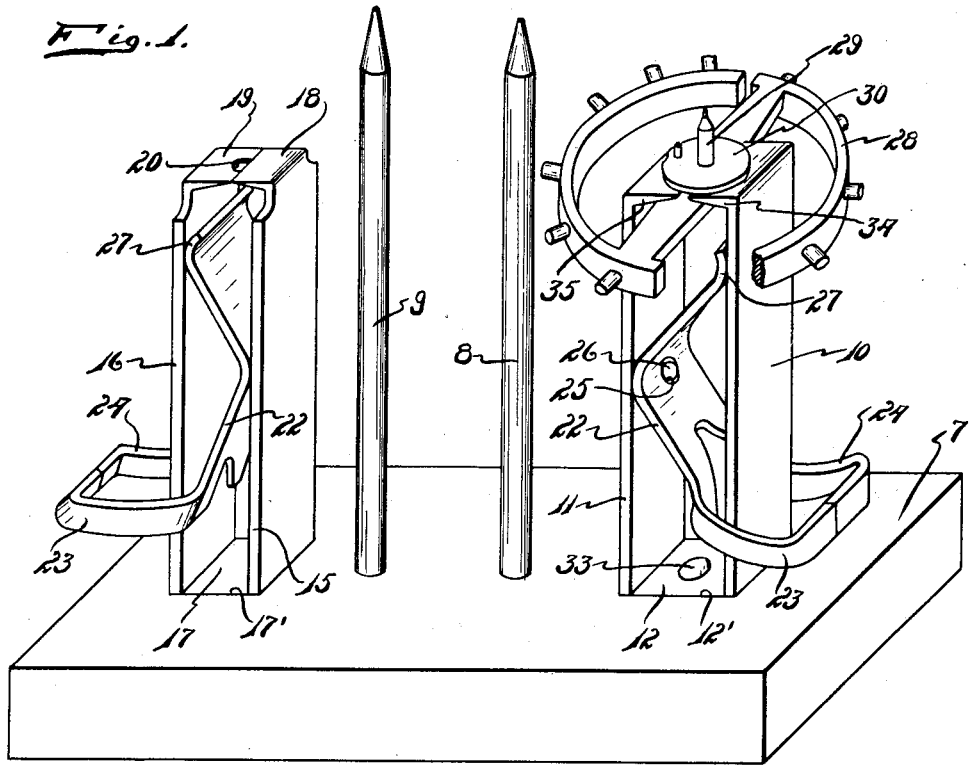
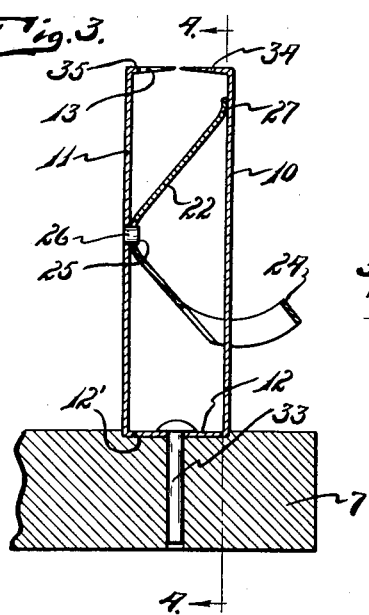
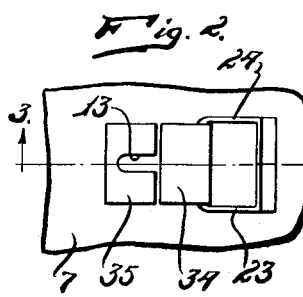
INVENTOR.
GEORGE F. PUTNAM
BY
ATTORNEY.

Patented Jan. 2, 1934

1,941,756

UNITED STATES PATENT OFFICE 1,941,756

ROLLER ABSTRACTOR

George F. Putnam, Goodrich, Mich.

Application July 30, 1932. Serial No. 626,867

1 Claim. (Cl. 29—88)

My invention relates to a new and useful improvement in a roller abstractor adapted for use in removing the roller from the balance staff of a watch. In watches in which a balance wheel is provided with a balance staff having a disc or roller mounted thereon it frequently becomes necessary to remove the roller from the balance staff. An object of the present invention is to provide a device in which such an operation may be easily and quickly effected with the elimination of possibility of damaging the balance staff or the balance wheel in the removal of the roller.

Another object of the invention is to provide a device of this class in which the assembled parts may be easily and quickly positioned in place for effecting the operation of removing the roller from the balance staff.

Another object of the invention is the provision in a device of this class of a pair of resilient supporting members which may be easily and quickly sprung apart for mounting the roller in position for removal and which will permit an easy and quick removal of the balance wheel from the device after the removal of the roller from the balance staff.

Another object of the invention is the provision of a device of this class which will be simple in structure, durable, economical of manufacture, and highly efficient in use.

Other objects will appear hereinafter.

The invention consists in the combination and arrangement of parts hereinafter described and claimed.

The invention will be best understood by a reference to the accompanying drawing which forms a part of this specification and in which, Fig. 1 is a perspective view of the invention.

Fig. 2 is a fragmentary top plan view of one of the supporting members.

Fig. 3 is a vertical longitudinal sectional view of one of the supporting members.

Fig. 4 is a sectional view taken on line 4—4 of Fig. 3.

In the assembled structure I provide a pair of supporting members so that the device may be accommodated to all of the various sizes of watches which are customarily handled by watch makers. In the invention I provide a base 7 and detachably mounted on and projecting upwardly from the base 7 are punches 8 and 9.

A U-shaped member embodying the supporting legs 10 and 11 and the bite 12 is mounted on the base. To this end the base 7 is proivded with a recess 12' in which engages the bite 12. A pin 33 projects into the base 7 and serves to retain this U-shaped supporting member in position. The supporting member is made from resilient material so that the legs 10 and 11 may be sprung apart and when the separating pressure is released these legs will approach again to normal position. The upper end of the leg 10 is provided with the inturned portion 34 which is in alignment with the inturned portion 35 of the upper end of the leg 11. The inturned portion 35 is provided with a slot 13 formed centrally therein and extending inwardly from its edge. These inturned portions 34 and 35 may be said to form supporting platforms carried by the resilient supports or legs 10 and 11.

On the same base 7 I provide another U-shaped member formed from resilient material consisting of the supporting legs 15 and 16 connected by the bit 17 which engages in the recess 17' formed in the base 7. The supporting platform forming portions 18 and 19 are formed on the upper ends of the legs 15 and 16, these portions being in alignment with each other and normally in engagement with each other. A recess 20 is formed on the edge of the portion 19, these recesses being provided to accommodate a jewel secured to and projecting from the face of the roller.

In order to separate the legs 10 and 11 or the legs 15 and 16 I have provided a rockable spreader embodying the rigid bow-shaped member 22 having one end split and provided with the spread apart arms 23 and 24 which are bent into embracing relation on the leg 10 or the legs 16 as the case may be. In each of these bow-shaped spreader members 22 there is formed an opening 25 through which projects the stud 26 carried by the legs 11 or the leg 15. The opening 25 is considerably larger than the stud 25 as clearly appears in Fig. 1 and the projection of the stud 26 through the opening serves as a means for rockably mounting the bow-shaped spreader member on one of the legs positioned between the legs. The upper end of the spreader member is angularly turned as at 27 to provide a contact portion. The construction is such that upon pressing downwardly on the rip portion which is formed by the angularly turned separate ends 23 and 24 the bow-shaped spreader member 22 is rocked so as to force the legs 10 and 11 or 15 and 16 apart. When thus forced apart the balance staff 29 which is carried by the balance wheel 28 and on which is mounted the roller or disc 30 may be positioned between the supporting platforms. When the device is used with the legs 10 and 11 the balance staff will engage in the slot 13 and when used with the supporting legs 15 and 16 the engagement of the balance staff will be in the notch 20. When placing in position a release of the downward pressure on the grip portion of the spreader member will permit the legs to spring together so as to snugly engage the balance staff beneath the roller 30. The operator may then, by using one of the punches 8 and 9, drive the balance staff downwardly, carrying the balance wheel 28 with it and thus effecting a removal of the roller 30 therefrom.

The device so constructed is one which may be very economically manufactured and which is compact. The mounting of the balance of supporting members on a single base affords a universal structure adapted for watches of various types and sizes. The balance wheel with the roller mounted on the balance staff may be easily and quickly placed in position and removal of the roller from the staff. Moreover, when the roller has been removed the balance wheel may be easily and quickly removed from the device. Thus I have provided a device of this kind in which a very easy and quick removal of the roller from the balance staff may be effected with a maximum saving in labor.

While I have illustrated and described the preferred form of my invention, I do not wish to limit myself to the precise details of structure shown but desire to avail myself of such variations and modifications as may come within the scope of the appended claim.

Having thus described my invention, what I claim as new and desire to secure by Letters Patent is:

A roller abstractor comprising a pair of spaced parallel resilient supporting legs; an inwardly directed platform forming portion on the end of each of said legs; a stud projecting inwardly from the inner face of one of said legs intermediate its ends; a bow shaped spreader member positioned between said legs and having an opening formed at its bow for reception of said stud, said opening being sufficiently large for permitting rocking of said member on said stud, one end of said member engaging the inner face of the leg opposite to said stud bearing leg; and gripping means projecting outwardly beyond the outer surface of said engaged leg.

GEORGE F. PUTNAM.